US 8,036,860 B2

(12) United States Patent
Frank et al.

(10) Patent No.: US 8,036,860 B2
(45) Date of Patent: Oct. 11, 2011

(54) MODELING HOMOGENEOUS PARALLELISM

(75) Inventors: Joachim H. Frank, Greenwich, CT (US); James Rumbaugh, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 921 days.

(21) Appl. No.: 11/781,363

(22) Filed: Jul. 23, 2007

(65) Prior Publication Data
US 2009/0031305 A1 Jan. 29, 2009

(51) Int. Cl.
*G06F 17/10* (2006.01)
(52) U.S. Cl. .......................................................... 703/2
(58) Field of Classification Search .................. 703/2
See application file for complete search history.

(56) References Cited

U.S. PATENT DOCUMENTS

| 5,724,575 A | 3/1998 | Hoover et al. |
| 2005/0010931 A1 | 1/2005 | Langkafel et al. |
| 2005/0108265 A1 | 5/2005 | Langkafel et al. |

OTHER PUBLICATIONS

Kumar et al. Performance Analysis and Scheduling of Stochastic Fork-Join Jobs in a Multicomputer System, IEEE Transactions on Parallel and Distributed Systems archive, vol. 4, Issue 10 (Oct. 1993) table of contents, pp. 1147-1164, Year of Publication: 1993.*
Fowler et al., UML Distilled: A Brief Guide to the Standard Object Modeling Language, Second Edition, Aug. 1999, Chapter 9 (pp. 151-164), Addison-Wesley Professional.*

* cited by examiner

*Primary Examiner* — Hugh Jones
(74) *Attorney, Agent, or Firm* — Law Office of Jim Boice

(57) ABSTRACT

A model of a process is created using novel "fan-out" and "fan-in" symbols. A fan-out symbol represents a point in the process flow where a variable number of homogeneous parallel outgoing threads are being split out from a single incoming thread. The fan-in symbol represents a point in the process flow where a variable number of parallel incoming threads with homogeneous output are combined into one or more outgoing threads.

18 Claims, 3 Drawing Sheets

MODELING HOMOGENEOUS PARALLELISM

BACKGROUND OF THE INVENTION

The present disclosure relates to the field of computers, and specifically to process modeling.

BRIEF SUMMARY OF THE INVENTION

A model of a process is created using novel "fan-out" and "fan-in" symbols besides the customary symbols for decision, merge, fork, join, task, etc. The novel "fan-out" and "fan-in" symbols permit modeling process behavior that cannot be modeled using these customary symbols. A fan-out symbol represents a point in the process flow where a variable number of homogeneous parallel outgoing threads are being split out from a single incoming thread. The fan-in symbol represents a point in the process flow where a variable number of homogeneous parallel incoming threads are combined into one or more outgoing threads.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
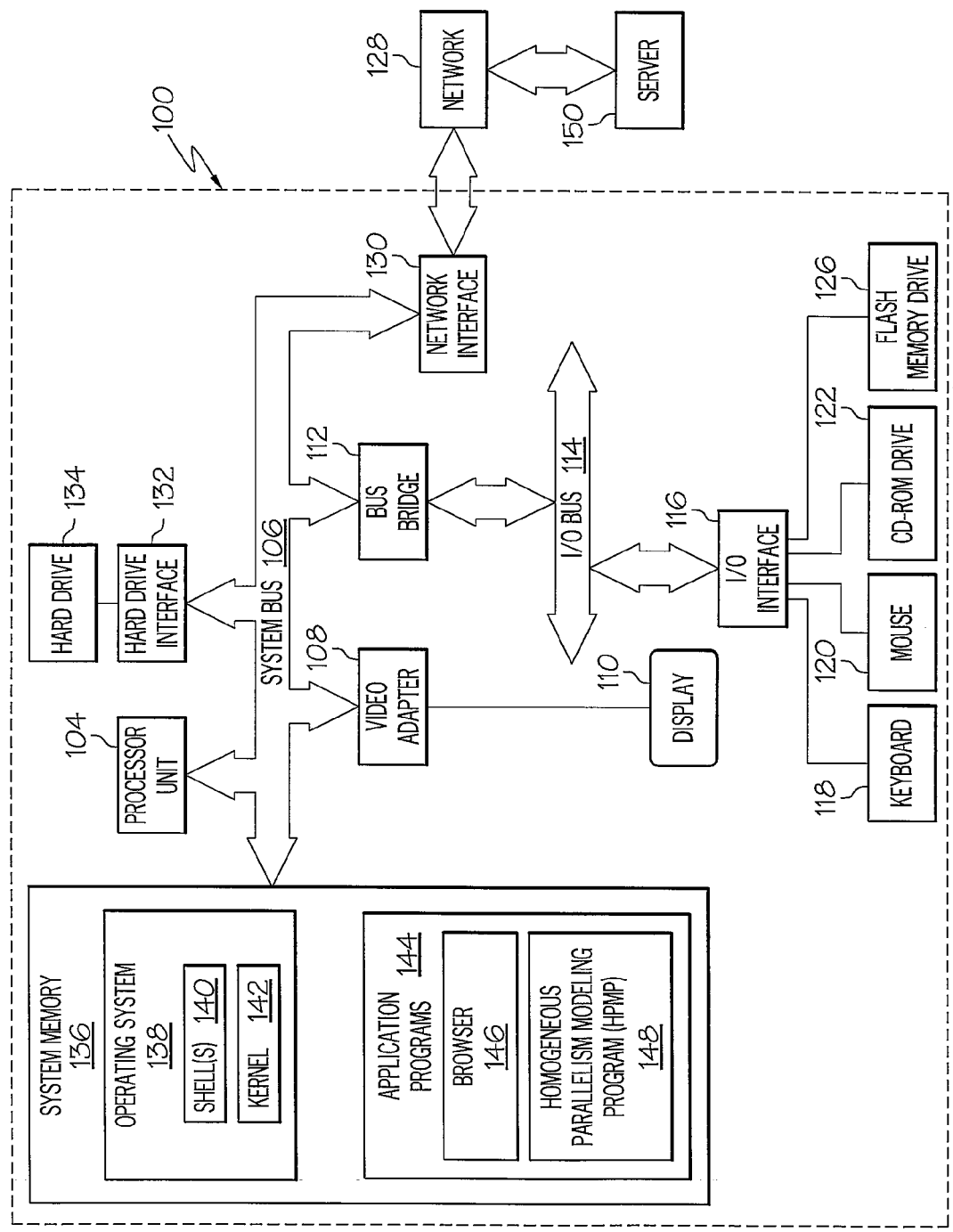
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the computer program product comprises a process editor and/or a process modeling tool. Such tools can be used for a number of purposes with the present invention, including but not limited to process documentation, process simulation and process definition for defining a process for execution in a runtime environment.

Any tangible computer usable or computer readable medium may be utilized. Specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Application programs 144 also include a Homogeneous Parallelism Modeling Program (HPMP) 148, which is preferably a process editor (and/or a process modeling tool) that includes software code for performing the methods described below in FIG. 2-3.

Computer 100 may utilize HyperText Transfer Protocol (HTTP) messaging to enable communication with server 150. In one embodiment, computer 100 is able to download HPMP 148 from service provider server 150, preferably in an "on demand" basis. In another embodiment, service provider server 150 performs all of the functions associated with the present invention (including execution of HPMP 148), thus freeing computer 100 from using its own resources.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
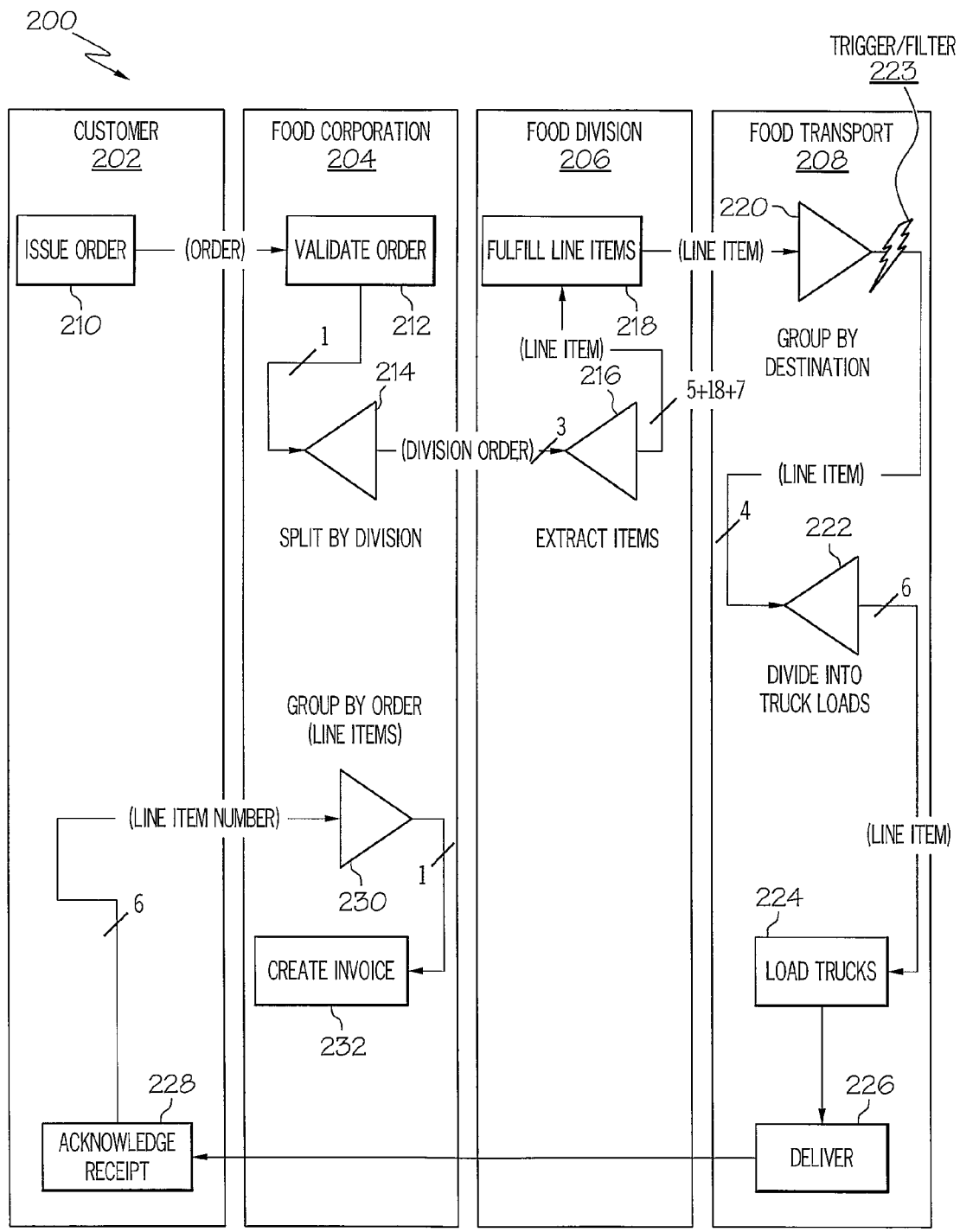
FIG. 2 illustrates an exemplary process model that uses novel fan-out and fan-in symbols.

With reference now to FIG. 2, an exemplary process model 200, which uses novel fan-in and fan-out symbols, is presented. Process model 200 depicts an exemplary process in which an order is issued, filled, shipped and billed. The depicted process takes place across four process components: customer 202, foodCorporation 204, foodDivision 206, and foodTransport 208. In the example shown in FIG. 2, each of the process components are disparate. This disparity may be due to at least one of the process components being executed by a different individual or enterprise, computer, software program, in a different physical location, enterprise division, etc. compared to the other process components. Thus, as will be discussed further below, since the splitting and re-joining of execution threads happens in different environments, it is not possible to model this process using prior art techniques such as a customary "for-all" construct. In addition, the fan-out/fan-in points are not fork/join points, since fork/join points split a process into a fixed number of parallel threads at a fork (the number of thread is known at modeling time) and recombine this known number of threads into one at a join. Note that in one embodiment, the term "thread" is used below to describe software threads. In another embodiment, however, the term "thread" is understood to describe any combination of human or automated tasks that execute part or all of a business process. Accordingly, the tasks of the process may be manifested through written communication, verbal communication, service protocols, etc.

The process model 200 begins with an order being issued ("issueOrder"—task 210). An order, which represents the initial thread of a new execution of the exemplary process, is sent from a customer component (customer 202) to a food corporation component (foodCorporation 204), where it starts an execution of task "validateOrder" 212. After validation, the foodCorporation (foodCorporation 204) will split the order thread into a variable number of threads (one per division) that will participate in the fulfillment. The spawning of multiple threads from a single order thread is modeled using the fan-out symbol. The outbound flow from the fan-out symbol thus represents a variable number of threads for each inbound thread to the fan-out. In this exemplary process, each of the threads spawned at this point is represented by a division order. The multiple threads resulting from a fan-out execute the same kind of behavior (tasks, steps), which is why this kind of parallelism is referred to as "homogeneous." (Note that parallel threads emerging from a prior art fork typically show a different behavior for each thread. Thus, the parallelism resulting from the execution of a prior art fork is also referred to as heterogeneous parallelism.)

Assume now, for exemplary purposes, that the "Order" contained line items for three types of food: 1) fruits/vegetables, 2) dairy products and 3) meat. The first fan-out point 214 would then split the incoming thread carrying an "Order" artifact into three outgoing threads carrying "DivisionOrders". The division orders would be addressed to the fruits/vegetables, dairy products, and meat processing divisions, respectively, and contain the order items that the target division is expected to fill. Thus, the first (fruits/vegetables) division order goes to a fruits/vegetables food division (one of the instances of food division 206), the dairy order goes to a dairy food division (another one of the instances of food division 206), and the meat order goes to a meat food division (a third instance of food division 206). Note that there is no forking of the threads followed by a local joining back of the threads, since the fanned-out threads are sent to different locales/divisions/processes/etc. In fact there is no requirement that the fanned-out threads ever be joined back into one thread, as would be the case had this been modeled using a "for all" or "for each". In a "for all" or "for each" process, a single unit of code takes inputs from an array to generate an output array. In the present model, however, the homogeneous parallel threads are simply extracted in a stand-alone executable form from each incoming thread and continue without any guarantee that they will ever be rejoined.

Note that when the incoming thread is split up, different threads can go to different swim lanes shown in FIG. 2. When a thread enters a process component (a "swim lane" such as that shown for customer 202, foodCorporation 204, foodDivision 206, foodTransport 208) and there are multiple instances of the process participant (for example, foodDivision 206) whose behavior this component represents, then addressing logic as the thread enters the target component must decide which of the participants this thread is destined for. For example, a division order may carry an electronic address (URL, e-mail address, etc.) that designates the target division 206.

In each division, a second fan-out point 216 breaks out each incoming thread. For example, assume that one of the threads (depicted) is for fruits/vegetables. This thread is split out into five threads: 1) lettuce, 2) tomatoes, 3) corn, 4) peaches and 5) bananas, one per line item in the division order. Each line item is filled (block 218—"fulfillLineItem"), and is then sent to the food transport 208 process component, where items are consolidated at a first fan-in point 220. If we assume that the original order contained 5 fruit/vegetable and 18 dairy and 7 meat line items, a total of 5+18+7=30 threads resulting from the one original order would arrive at the food transport company. Items are consolidated according to their destination, and all threads for items having a common destination are grouped. Note that the grouping of threads performed by the fan-in 220 does not reverse the splitting performed by either fan-out 214 or fan-out 216. This ability to join execution threads in a way that is not symmetric to their original spawning is another capability afforded by the present invention that is not afforded by a traditional "for-each" or "for-all." A fan-in must have a criterion to decide when "all" incoming threads have arrived, or when it is time to spawn an outbound thread that consolidates a number of incoming threads that have arrived up to this point. A grouping fan-in, as in this example where threads are grouped by shipping destination, has such criteria for each group of threads it collects (there can also be common criteria, which apply to several or all groups). The completion criterion for the fan-in 220 could be that all line items for a particular order that are destined for the same shipping location have arrived (the logic of the fan-in could determine this by looking up the order information in a database, using the original order number that comes with each line item as a key). Alternatively, the fan-in 220 could react to an external trigger 223 (timer, alert, etc.) and release groups of accumulated threads into outgoing threads when that trigger 223 occurs. For example, the food transport company could have a policy to collect incoming food deliveries (line items) until 4 PM each day, at which point the fan-in releases all deliveries that have arrived to that point, grouped by destination, so that trucks can be loaded for an over-night transport. Each outbound thread from the fan-in 220 thus represents a group of line items with the same destination, which is indicated by the array notation ("LineItem[ ]"). If there are four destinations for the food deliveries, then the fan-in 220 would consolidate the 30 incoming threads into 4 outgoing ones. The four outgoing threads may contain 5, 10, 12 and 3 line items, respectively, where each group of items has the same destination, but can contain a mix of fruit/vegetable, dairy, and meat products. The four groups of items are then split by a third fan-out point 222, which divides each group into truck loads. If we assume that one truck is needed for both the first and fourth group, but two trucks for the second and the third, then a total of 6 truck loads will result. The trucks are loaded (point 224) and the products delivered (point 226).

The customer then acknowledges receipt of the items in each truck load that arrives (block 228). The output of that step is an array of line item numbers, representing all items that a particular truck delivered. Those arrays are transferred back to the food corporation as an "acknowledgement of receipt" message. The food corporation consolidates them in a final fan-in whose grouping criterion is the order number carried by each "acknowledgement of receipt", and whose completion criterion is the arrival of all receipts for items in one original order (made possible since the food corporation retains copies of all original orders in a database). After all acknowledgements of receipt (one per truck) have been consolidated, by the fan-in point 230, a single outgoing thread is started to create an invoice (block 232—"createInvoice").

Note that a fan-in point may buffer inbound flows during an extended period of time, while fan-out points instantly explode one inbound thread of execution. That is, a fan-in point may be designed such that fan-in occurs only after necessary incoming threads have arrived, while a fan-out preferably occurs immediately, since each thread being input to the fan-out contains all needed information to create the resulting batch of outgoing threads.

Note also that threads that are being combined by a fan-in need not come from an output of a fan-out. Thus, while the first fan-in 220 used threads from the second fan-out 216 in the example shown, alternatively threads being input into any fan-in (including fan-in 220) may come from any source (not shown), assuming that all threads being input into the fan-in are materialized as the same kind of message, item(s), or document(s).

Figure 3:
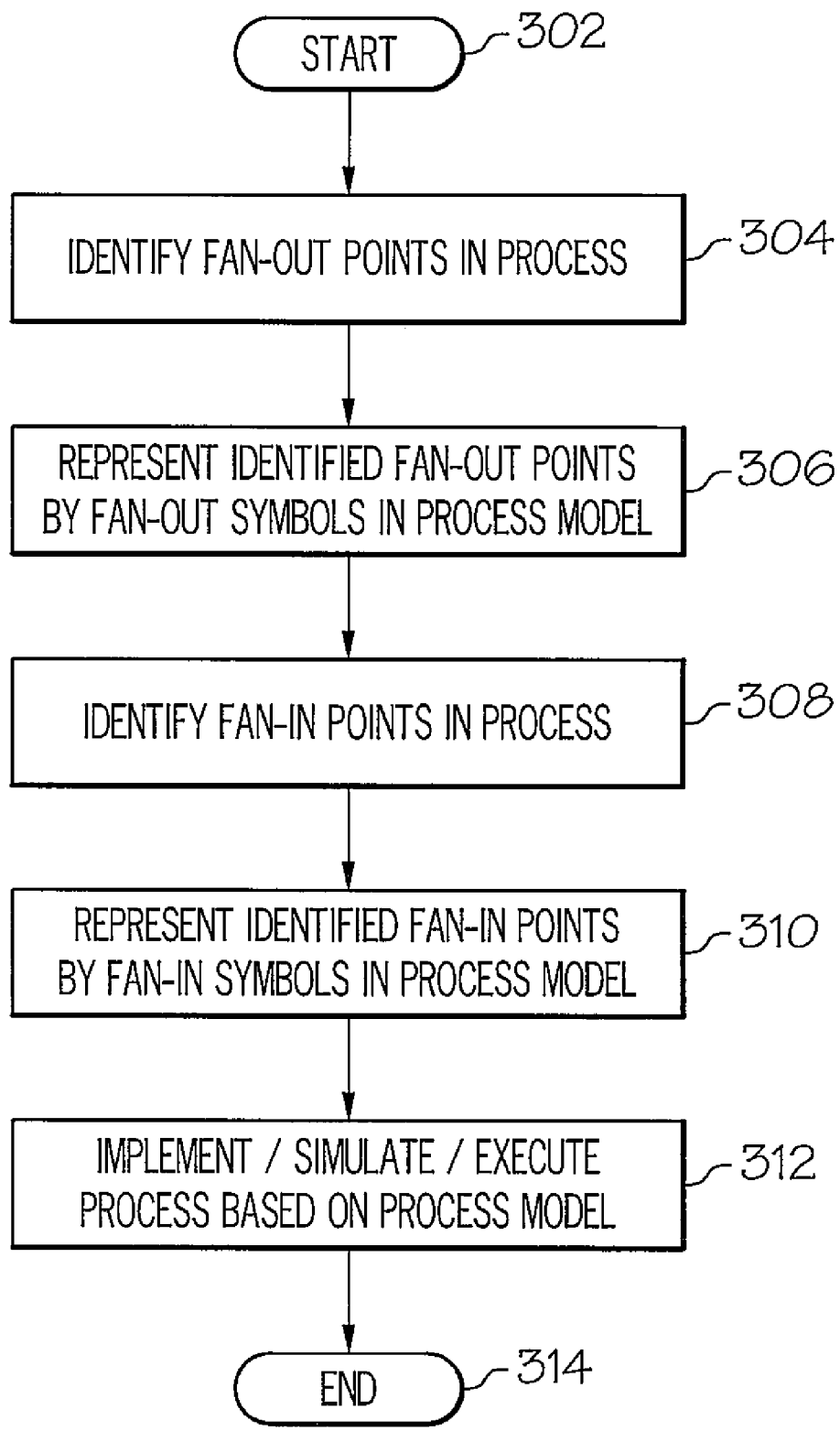
FIG. 3 is a high-level flow-chart of exemplary steps taken to model a process using fan-in and fan-out symbols.

Referring now to FIG. 3, a high-level flow-chart of steps taken to model a process using fan-out and/or fan-in point symbols is presented. After initiator block 302, fan-out points are identified (block 304). In a preferred embodiment, fan-out points are defined as points in which a single incoming thread is split out into a variable number of homogeneous outgoing threads that can be executed in parallel. Each identified fan-out point is then represented by a fan-out symbol in the process model (block 306), preferably as an apex-to-base triangle as shown in FIG. 2. Similarly, any fan-in points are identified (block 308), in which a variable number of incoming threads are combined into one or more outgoing threads. Each identified fan-in point is represented by a fan-in symbol in the process model (block 310), preferably as a base-to-apex triangle as shown in FIG. 2. The process model can then be used to implement a process that is described by the model (block 312), which can then be executed in a (human and/or automated) environment that understands the semantics of "fan-out" and "fan-in." The steps end at terminator block 314.

Note that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer implemented method for modeling homogeneous parallelism in a process, the method comprising:
    a processor identifying a fan-out point in the process, wherein the fan-out point occurs where the process splits a single incoming task thread into a variable number of homogenous parallel outgoing task threads, and wherein the homogeneous parallel outgoing task threads are created in accordance with a fan-out parameter that is part of the single incoming task thread and is used to determine the variable number of homogeneous parallel outgoing task threads, and wherein said single incoming task thread is configured to be fanned out by a first entity;
    the processor representing the fan-out point with a fan-out symbol in a process model;
    the processor identifying a fan-in point in the process, wherein the fan-in point occurs where a variable number of incoming task threads with homogeneous output are recombined into a single outgoing task thread, and wherein the fan-in point defines grouping criteria for incoming task threads and completion criteria for each group of task threads, wherein the completion criteria and external completion triggers determine when a group of task threads being fanned-in is complete, wherein said variable number of incoming task threads are configured to be recombined by a second entity, and wherein said single incoming task thread is a combination of human and automated tasks that execute a business process;
    the processor representing the fan-in point with a fan-in symbol in the process model; and
    the processor utilizing a unique disparate task thread identifier to identify which entity from the first entity and the second entity executes a disparate task thread that is identified by the unique disparate task thread identifier, wherein disparate task threads are executed by disparate process components by different entities, and wherein each of the different entities are one of a group consisting of an individual, an enterprise, an enterprise division, and a computer.

2. The computer implemented method of claim 1, wherein the task threads being fanned-in do not come from an output of the fan-out point.

3. The computer implemented method of claim 1, wherein the unique disparate task thread identifier is retained at each fan-out by copying the unique disparate task thread identifier to each of corresponding outgoing task threads produced by the fan-out, wherein an identification of a set of task threads, which is created at the fan-out point, enables re-joining of a same set of task threads at a later stage in the process model.

4. The computer implemented method of claim 1, wherein a fanned-out quantity of task threads being fanned-out differs from a fanned-in quantity of task threads being fanned in.

5. The computer implemented method of claim 1, wherein a task thread combining action of the fan-in point is initiated by a "completeness condition" that is evaluated each time a new task thread arrives, and wherein the "completeness condition" becomes true whenever a complete set of task threads required to create an outbound task thread has arrived at the fan-in point.

6. The computer implemented method of claim 1, wherein a fan-in point is configured with a grouping criterion, wherein the grouping criterion is evaluated on each incoming task thread to establish an output bucket for each incoming task thread, and wherein task threads in the output bucket are released into a single outgoing task thread when the grouping criterion for the bucket has become true.

7. The computer implemented method of claim 1, wherein the executions by the disparate process components are performed by different divisions in an enterprise.

8. The computer implemented method of claim 1, wherein the executions by the disparate process components are performed by different companies in an enterprise.

9. The computer implemented method of claim 1, wherein the disparate process components are realized as computer software instructions that are executed by different computers.

10. The computer implemented method of claim 1, wherein the completion criteria is an external trigger.

11. The computer implemented method of claim 1, further comprising:
    associating an associated software with each element represented in the process model; and
    executing the associated software.

12. The computer implemented method of claim 1, further comprising:
    associating a human task with each element represented in the process model; and
    executing the human task.

13. A system comprising:
    a processor;
    a data bus coupled to the processor;
    a memory coupled to the data bus; and
    a computer-usable medium embodying computer program code, the computer program code comprising instructions executable by the processor and configured for modeling homogeneous parallelism in a process by performing the steps of:
    identifying a fan-out point in the process, wherein the fan-out point occurs where the process splits a single incoming task thread into a variable number of homogenous parallel outgoing task threads, and wherein the homogeneous parallel task threads are created in accordance with a fan-out parameter that is part of the single incoming task thread and is used to determine the variable number of homogeneous parallel outgoing task threads;

representing the fan-out point within a first entity with a fan-out symbol in a process model;

identifying a fan-in point in the process within a second entity, wherein the fan-in point occurs where a variable number of incoming task threads with homogeneous output are recombined into a single outgoing task thread, and wherein the fan-in point defines grouping criteria for incoming task threads and completion criteria for each group of task threads, wherein the completion criteria and external completion triggers determine when a group of task threads being fanned-in is complete, wherein said variable number of incoming task threads are configured to be recombined by the second entity, and wherein said single incoming task thread is a combination of human and automated tasks that execute a business process;

representing the fan-in point with a fan-in symbol in the process model; and utilizing a unique disparate task thread identifier to identify which entity from the first entity and the second entity executes a disparate task thread that is identified by the unique disparate task thread identifier, wherein disparate task threads are executed by disparate process components by different entities, and wherein each of the different entities are one of a group consisting of an individual, an enterprise, an enterprise division, and a computer.

14. The system of claim 13, wherein a quantity of the homogeneous parallel task threads is unknown when the process is initially modeled.

15. A tangible non-transitory computer-readable medium encoded with a computer program, the computer program comprising computer executable instructions configured for:

identifying a fan-out point in the process, wherein the fan-out point occurs where the process splits a single incoming task thread into a variable number of homogenous parallel outgoing task threads, and wherein the homogeneous parallel task threads are created in accordance with a fan-out parameter that is part of the single incoming task thread and is used to determine the variable number of homogeneous parallel outgoing task threads;

representing the fan-out point within a first entity with a fan-out symbol in a process model;

identifying a fan-in point in the process within a second entity, wherein the fan-in point occurs, where a variable number of incoming task threads with homogeneous output are recombined into a single outgoing task thread, and wherein the fan-in point defines grouping criteria for incoming task threads and completion criteria for each group of task threads, wherein the completion criteria and external completion triggers determine when a group of task threads being fanned-in is complete, wherein said variable number of incoming task threads are configured to be recombined by the second entity, and wherein said single incoming task thread is a combination of human and automated tasks that execute a business process;

representing the fan-in point with a fan-in symbol in the process model; and utilizing a unique disparate task thread identifier to identify which entity from the first entity and the second entity executes a disparate task thread that is identified by the unique disparate task thread identifier, wherein disparate task threads are executed by disparate process components by different entities, and wherein each of the different entities are one of a group consisting of an individual, an enterprise, an enterprise division, and a computer.

16. The tangible non-transitory computer-readable medium of claim 15, wherein a quantity of the homogeneous parallel task threads produced at a fan-out point is unknown when the process is initially modeled.

17. The tangible non-transitory computer-readable medium of claim 15, wherein the computer-usable medium is a component of a remote server, and wherein the computer executable instructions are deployable to a supervisory computer from the remote server.

18. The tangible non-transitory computer-readable medium of claim 15, wherein the computer executable instructions are capable of being provided by a service provider to a customer on an on-demand basis.

\* \* \* \* \*